Dec. 31, 1963 P. F. DEISLER, JR 3,116,344
VORTEX TUBE REACTOR AND PROCESS FOR CONVERTING
HYDROCARBONS THEREIN
Filed Aug. 19, 1960 2 Sheets-Sheet 1

INVENTOR:
PAUL F. DEISLER, JR.
BY: *Oswald H. Milmore*
HIS ATTORNEY

United States Patent Office 3,116,344
Patented Dec. 31, 1963

3,116,344
VORTEX TUBE REACTOR AND PROCESS FOR CONVERTING HYDROCARBONS THEREIN
Paul F. Deisler, Jr., Berkeley, Calif., assignor to Shell Oil Company, New York, N.Y., a corporation of Delaware
Filed Aug. 19, 1960, Ser. No. 50,802
14 Claims. (Cl. 260—679)

The invention relates to a vortex-tube reactor suitable for carrying out short-period, high-temperature reactions and to a method of producing unsaturated hydrocarbons by dehydrogenating other hydrocarbons in a vortex-tube reactor, such as that disclosed herein. The reactor may be used for carrying out a variety of reactions, and is especially useful for the dehydrogenation of hydrocarbons in accordance with the improved method according to this invention.

The conversion process includes, but is not restricted to, subjecting a stream of reactant hydrocarbons for a short time to elevated temperature at which equilibruim conditions favor the formation of hydrocarbons having a carbon-to-hydrogen ratio of unity, viz., acetylene, followed by quenching, to inhibit reversion of the products to olefins. It may, however, also be used for the production of olefins by dehydrogenating saturated hydrocarbons and the preparation of charging streams for subsequent formation of aromatics, such as benzene.

Among the hydrocarbons which can be subjected to dehydrogenation according to the invention are normally gaseous hydrocarbons, such as methane, ethane, ethylene, propane, propylene, butanes, and butylenes normally liquid hydrocarbons, such as pentanes and hexanes, petroleum distillates and residuals, and mixtures of the foregoing.

Because of the endo-enthalpic nature of such dehydrogenation reactions large quantities of thermal energy at a high temperature level are required. For example, in the production of ethylene or acetylene from methane, ethane or propane the dehydrogenation occurs at temperatures which start at between about 1000° and 2000° C. and diminish as the reaction proceeds, to permit the reactions to be completed in very short times, usually less than one-tenth second and often within a few milliseconds or less than one millisecond. When lower temperatures are used reactions proceed too slowly; either they do not occur appreciably in a long time or undesirable side reactions take place. For example, the reactants may be largely pyrolyzed to carbon and hydrogen, with reduced formation of the desired unsaturated hydrocarbons. To prevent prolonged exposure to such lower pyrolysis temperatures the reactants must be heated rapidly and quenched promptly after the desired reaction is completed.

Because these severe requirements cannot be met by heat exchange equipment, such as fired tubular heaters and pebble heaters, other techniques have been used, such as partial combustion or mixing the reactants with hot flame products, resulting from burning hydrogen or hydrogen-containing fuel with oxygen, such as pure oxygen, oxygen-enriched air or air.

It was found that the use of partial combustion and hot flame products, in accordance with known practice, inhibit the yield of desirable unsaturates because of the presence in the combustion products of oxygenated dissociation products which react with the unsaturated hydrocarbons. For example, at 2127° C. and atmospheric pressure 4% of the $H_2O$ vapor is dissociated to $O_2$, O and OH, and at 2850° C. about 21% of such vapor is dissociated. The hydrocarbon reactants are commonly mixed with flame gases when the latter are at a temperature between these values. This has made it impossible to realize the increased yield of acetylene predictable for higher temperatures from equilibrium constants for the dehydrogenation reaction.

When hydrocarbons such as acetylene are desired it is necessary to employ temperatures higher than those used to produce olefins. For example, ethane reacting at about 1000° C. yields mainly ethylene, whereas at 1300° C. or higher acetylene is produced as a principal product. Due to the endothermic nature of the reaction these equilibrium temperatures are, in the known technique, attained only by starting at considerably higher temperature, at which large amounts of oxygenated dissociation products occur, or by excessive dilution.

Steam dilution of the flame products to lower the temperature and reduce thermal dissociation is thermally inefficient. It also increases the amount of water vapor.

It is an object of the invention to provide an improved process for dehydrogenating hydrocarbons whereby the desired reaction temperature can be attained for brief periods of time with heat input at a lower temperature level, making it possible to effect such heating without or with reduced introduction of oxygenated dissociation products or dilution. More specifically, the invention makes it possible, in some instances, to preheat the hydrocarbon reactants entirely or principally by indirect heat exchange, as in a fired tubular heater or pebble heater, and hot gases, such as flame gases, when used, are used in smaller amounts, whereby the contents of such oxygenated dissociation products in the reacting stream is reduced significantly.

A further object is to provide a process for dehydrogenating hydrocarbons wherein a lower preheat temperature is made possible by a combination of steps, including by the injection of a temperature-stabilizing substance into flame gases and boosting the temperature of the reacting mixture in a vortex-tube reactor.

Still another object is to provide a reactor for carrying out short-time, high-temperature reactions wherein a part of the preheated stream of reactant gas admitted to the reactor is brought to an elevated temperature by transfer of heat thereto by the heat-separation effect from another part of the stream and the heated part is quenched to cool it to below reaction temperature.

In summary, the process according to the invention includes the steps of preheating a stream of hydrocarbon reactant to a temperature of at least 700° C. essentially in the absence of oxygen and oxygenated dissociation products to produce a gaseous stream wherein the hydrocarbons may, if desired, be partially dehydrogenated and admitting said stream into a vortex-tube reactor wherein heat is transferred by the heat-separation effect from the part of the gas at the vortex core to the part at the vortex periphery to heat the latter to effect dehydrogenation. The gas is discharged continuously from the reactor, either as a plurality of separate streams comprising the colder gas at the vortex core and the heated gas at the vortex periphery, or as a combined stream, and at least the effluent containing the heated gas is quenched to stop the reaction.

When the stream is partially dehydrogenated prior to entry into the vortex-tube reactor it is preferably brought to a temperature somewhat above 700° C., e.g., to have, at the end of the partial dehydrogenation, a temperature 800–1200° C., to promote olefin formation and limit the formation of undesirable pyrolysis products. It is then fed into the reactor wherein a part of the partially reacted mixture is further heated to a temperature above 1050° C. to promote further dehydrogenation in said part with the formation of acetylene.

Preheating of the hydrocarbon reactant can be effected in stages. Thus, heating up to about 500° to 900° C. can be effected by indirect heat exchange, as in a fired tubular heater or pebble heater; the higher temperatures are then attained by mixing the reactants with a hot gas which is essentially free from oxygen and oxygenated dissociation products. Preferably, both indirect heating and mixing with hot gas are used in sequence.

The process is distinguished from prior proposals to mix hot flame products with hydrocarbon reactants prior to flow into a vortex tube reactor in that such hot flame products, when used, are brought from their initial temperature above 2100° C. to a temperature below about 1700°–1600° C. (depending on the pressure) at which dissociation of water vapor is small, before admixture of the reactant. In other words, the flame temperature is reduced to a temperature at which oxygenated dissociation products of water are substantially absent, which condition is herein deemed to be met when less than 0.4% of the water vapor is dissociated. This occurs at about 1700° C. at a pressure of 2 atmospheres (abs.) and at about 1600° C. at a pressure of one-half atmosphere. In the preferred operation this cooling is effected without dilution with a colder gas or steam and without abstracting a large amount of energy from the gas which would necessitate the use of larger quantities of the heating gas for attaining a given temperature rise and lead to thermal inefficiency. Instead, according to the preferred procedure a temperature-stabilizing substance having a vaporizing temperature within the range of dehydrogenation temperatures to be employed is injected in the non-gaseous state into the hot flame gases and vaporized therein prior to admixture of the hydrocarbons. This substance cools the flame gases, e.g., below 1700° C. and is advantageously injected in the liquid state in amount to cool said gases to a temperature within 300° C. of the said vaporizing temperature at the partial pressure of said substance prevailing in the flame gas. Preheating of the substance is desirable. Upon vaporization said substance stores energy as latent heat and gives up this energy upon condensation when the temperature falls as a result of the endothermic dehydrogenation reaction prior to entry into the vortex-tube reactor. The substance thereby supplies a part of the heat of reaction. To avoid revaporization in the temperature-stabilizing substance in the vortex-tube reactor and thereby limiting the temperature rise of the part of the gas at the periphery it is usually preferred in most cases to use a substance which has a vaporizing temperature, at the partial pressure thereof prevailing in the peripheral region of the vortex tube, which is above the highest temperature attained at said peripheral region.

It is, however, also possible to use a vaporizing substance which will vaporize within the vortex tube reactor; this would be desirable in those instances in which it is desired to limit the temperature rise in the vortex tube reactor.

Summing up the foregoing requirements, the temperautre stabilizing substance has a vaporizing temperature under the conditions prevailing within the vortex-tube reactor between about 1000° and 1700° C., and preferably above the highest temperature in said reactor. Examples of such substances are halides and oxides of the class consisting of alkali metals and alkaline earth metals, such as barium fluoride, calcium chloride, cesium bromide, lithium bromide, lithium chloride, lithium fluoride, lithium iodide, magnesium bromide, magnesium chloride, potassium chloride, potassium fluoride, potassium iodide, and sodium chloride. Other substances, such as antimony trioxide, boron oxide, cadmium fluoride and silver chloride, may also be used.

The novel vortex tube reactor according to the invention comprises an elongated tube, shaped internally as a surface of revolution and having a diameter which may be uniform or non-uniform along its length, having inlet means, such as tangential inlets, for admitting the preheated gas with a strong vortical motion, orifice means, such as a disc with a central orifice, for discharging cold gas from the core of the gas vortex, a hot-gas outlet, and quench means, such as liquid spray devices, for quenching at least the hot gas rapidly to below reaction temperature. The reactor is constructed of materials suited to the high temperatures encountered and, when used for dehydrogenation of hydrocarbons at the elevated temperatures, is largely made of refractory ceramic and ceramic-lined refractory metal.

A vortex tube is a well-known device having a gas inlet for forming a gas vortex, wherein there occurs a transfer of energy from the gas at the vortex core to the gas at the vortex periphery, adjoining the tube wall, and wherein the latter part moves as a helical stream along the tube wall away from the inlet and a core of colder gas occurs within said helical stream; the latter core may flow concurrently with the hot gas, i.e., away from the inlet, but more usually it flows in the opposite direction, being augmented along the tube by gas which flows radially inwards and is eventually discharged through a central orifice near the inlet. The ratio of the hot and cold gas streams discharged can be varied by throttling one or both of the outlets; they can be operated with one of these outlets closed entirely, so that the separation into hot and cold gas fractions is only transistory. The principle of the vortex tube, as applied for effecting refrigeration, is described in the U.S. Patent to Hendal, No. 2,893,215, and in the literature references cited therein, and need not, therefore, be set forth further herein.

Because the temperature difference between the hot gas within the vortex tube and the admitted gas (herein called the temperature rise) is proportional to the absolute temperature of the feed stream, significant temperature rises can be realized in the hot end of the tube when the feed stream is preheated to above 700° C., and even more so when inlet temperatures above 800° C. are used. The actual temperature rise is influenced by the operating condition, such as the external tube wall temperature and the ratio of the cold and hot gas streams discharged, and become greater as higher inlet velocities are used. It is desirable to employ velocities as close as possible to the local sonic velocity at the inlet. The temperature rise is further influenced by the heat of reaction and is, for example, decreased when endothermic dehydrogenation occurs and also limited when a temperature-stabilizing substance is vaporized. In general, it may be said that temperature rises of at least 80° C. are desired and that temperature rises more than 200° C. are attainable.

By the use of the vortex-tube reactor reactants can be held at the highest reaction temperatures for brief periods, in that the transfer of heat to the hot fracion is from another part of the admitted stream itself and occurs rapidly. An important advantage of the invention is that it is not necessary to attain the highest reaction temperature required, for example, to form acetylene, in the usual thermal cracking reactor or by admixture with flame products which are so hot as to contain large amounts of oxygenated dissociation products. Instead, a small vortex-tube reactor can accomplish the final acetylene-enrichment of the preheated and partially dehydrogenated hydrocarbon stream, which was heated in a heater or by hot gases to a lower temperature, and only the small reactor need be constructed of costly, high-temperature resistant materials.

The invention will be described further with reference to the accompanying drawings forming a part of this specification and illustrating two preferred embodiments, wherein.

Figure 1:
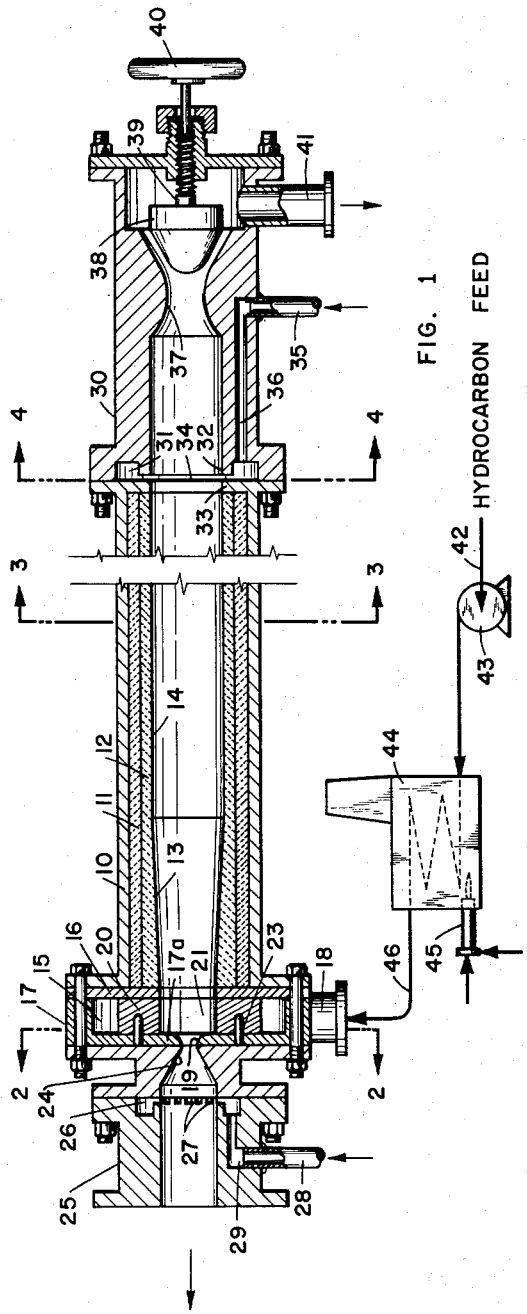
FIGURE 1 is a longitudinal sectional view through a vortex-tube reactor, certain auxiliary equipment being shown diagrammatically and not to scale.
Figure 4:
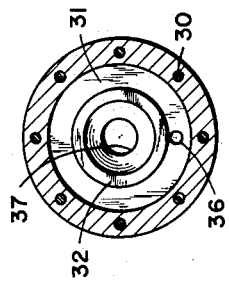
FIGURES 2, 3 and 4 are transverse sectional views taken on the correspondingly numbered lines of FIGURE 1.
Figure 3:
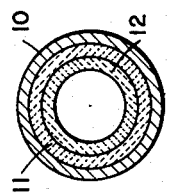
Figure 2:
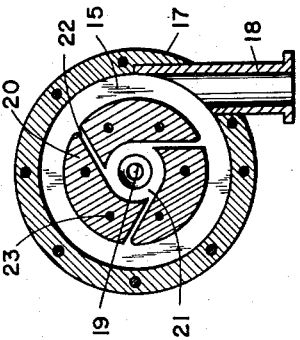

Referring to FIGURES 1–4, the vortex-tube reactor includes a cylindrical shell 10 lined with temperature-resistant material 11 and a refractory material 12, such as alumina, the latter having an interior surface of revolution and defining the hot end of the tube. It may include a divergent section 13 which may, for example, diverge at an angle between 2° and 6° through a distance of one to ten times the initial diameter, and a cylindrical section 14. A feed chamber 15 is defined by an annular plate 16 and a housing 17, the latter having a tangential inlet pipe 18 fitted thereto. The housing further has a cold-gas orifice 19 situated at the central axis and formed in the transverse housing walls 17a. Mounted between the latter wall and the plate 16 is a plurality of, e.g., three, vane blocks 20 which jointly define a swirl chamber 21 having a substantially cylindrical shape and communicating with the chamber 15 via tangential inlet passages 22 defined by adjacent vane blocks. These vane blocks are retained in the desired relative positions by longitudinal pins 23 which are secured in the transverse housing wall 17a. (These blocks may be secured permanently in the desired angular relation to provide passages 22 of the optimum width by these pins or may be adjustable, as is described in the U.S. patent to Hendal, No. 2,907,174.) It will be understood that because the parts 16–23 come into contact with hot gases they must be constructed of suitable materials, such as high-melting alloys, such as stainless steel or the alloy consisting of 70–75% Fe, 25–30% Cr, up to 0.5% Mn, up to 0.25% C, and a trace amount of Ni. It is also possible to construct these parts of such metal, coated with refractory material, such as aluminum oxide or zirconium oxide or boride, tungsten carbide, or the like, and provide a cooling jacket (not shown), or to form the parts directly of non-metallic refractory material. Coating of these parts can be effected by fusing the material and applying it by plasma means. The layer 13 can likewise be so applied or coated.

The cold-gas orifice 19 discharges into a diverging tube 24 which is optionally bolted to a quenching section 25, formed with an annular distributing channel 26 and serrated at its ends to form orifices or ports 27 when placed against the tube 24. Quench liquid is supplied to the channel by a duct 28 and a bore 29.

The hot end of the tube is bolted to a combined quenching and flow-control section 30, formed with an annular distributing channel 31 and an annular inner wall or lip 32 which has a small clearance, e.g., 0.002 to 0.01 inch, with respect to the annular plate 33 at the end of the tube, thereby defining an annular spray slit 34. While separate ports 27 were shown for one quenching device and a continuous slit for the other, it is evident that both could be of the same type. Quench liquid is supplied to the channel 31 by a duct 35 and a bore 36. The section 30 has a throat 37 and the bore diverges beyond the throat to cooperate with a throttling device, embodied as a conical valve 38 which can be adjusted axially by means of a threaded shaft 39 and a handwheel 40. The section has an outlet pipe 41 for the quenched gas.

The hydrocarbon feed to be dehydrogenated is admitted in gaseous or liquid form by a line 42, brought to the desired pressure by a feed blower or pump 43, and brought to a temperature at least 700 C., in a furnace 44 having one or more burners 45 and preferably including the usual convection and radiant heating sections, to effect rapid heating. The heated stream, in gaseous form, is transferred by a line 46 (which may be lined with refractory material) to the inlet pipe 18.

For the most effective heat-separation effects in the vortex tube reactor it is desirable that the admitted gas stream enter the swirl chamber 21 at the local sonic velocity of the gas. This usually requires the pressure in the feed chamber 15 to be at about twice that within the swirl chamber. By way of example, when the pressure in the swirl chamber is 18 lb. per sq. in. abs. the pressure in the feed chamber should be at least 32 lbs. per sq. in abs. The reactor may be operated with the latter at superatmospheric, atmospheric, or subatmospheric pressure; in the last-mentioned case it is, of course, necessary to provide suitable suction devices at the outlets to the section 25 and pipe 41.

The swirl chamber 21 is in free communication with the hot end of the tube and the gas at the periphery of the gas vortex moves as a helical stream through the sections 13 and 14. This part of the gas is heated by transfer of heat from the gas at the core of the gas vortex. Some heat transfer occurs within the swirl chamber, but further heating occurs in the hot end of the tube. Within this part of the tube there is also a colder core of gas, which is augmented by gas flowing radially inwards at least in the zone near the swirl chamber and which flows back toward the swirl chamber, from which it is discharged through the orifice 19.

The amount of heat transfer depends upon the operating conditions, among which are the angular velocity of the gas (influenced not only by the velocity at the ends of the inlets 22 but also by the smoothness of the refractory lining in the hot end), the ratio of the hot and cold gas fractions discharged through the pipe 41 and the section 25, respectively. This ratio can be controlled by means of the valve 38. Various modes of operation are possible: (a) The valve may be positioned so that from 25% to 75% of the gas is discharged via the pipe 41, (b) the valve may be closed so that all of the gas is discharged through the orifice 19, (c) the orifice 19 may be omitted (i.e., the vortex chamber wall 17a may be continuous) and the total gas stream can be discharged from the hot end. In the last two cases the heat separation is only transitory, and the heated part of the gas is, after undergoing reaction, recombined with the cold fraction.

The temperature attained by the peripheral part of the gas depends on the amount of heat transfer from the core part, the amount of heat transferred to or from the reactants (heat flow being into the reactants in the case of dehydrogenation of hydrocarbons) and the tube wall temperature.

The residence time of the hot gas fraction depends upon the length of the tube and the flow rate therethrough. It is usually desirable to make the length (measured from the swirl chamber 21 to the quench slit 34) from four to twenty-five times the initial diameter. The actual heat separation effect occurs at the end of the tube near the swirl chamber, principally within the diverging section in the embodiment shown, within which a core of relatively colder gas flows toward the swirl chamber. The swirl velocity becomes less nearer the quench slit and when long tubes, e.g., over about ten times the inlet diameter, are used there is a zone near the quenching slit where the gas temperature tends to become equal across the cross section of the tube. Residence or reaction times for the hot fraction of the order of $10^{-1}$ to $10^{-3}$ are readily attained. The quenching liquid is advantageously at a temperature below 500° C., e.g., water below its boiling point, admitted in amount sufficient to cool the reacted mixture to below reaction temperature, preferably below 500° C.

Because the stream emerging through the orifice 19 is in some instances below its reaction temperature, quenching through the ports 27 can in some cases be omitted.

When the hydrocarbon stream in the inlet pipe 18 is at a temperature of about 700°–800° C. and the heating and flow are rapid, only limited dehydrogenation occurs before a part thereof is heated to reaction temperature within the tube, and the dehydrogenation products contain principally olefins. Most of the reacted gas is quenched at the slit 34 and is discharged through the pipe 41, while a part of it enters the core of colder gas and is discharged through the orifice 19 with the colder gas.

However, when temperatures above 800° C., e.g., 800° to 1200° C., are used, the entering stream undergoes considerable dehydrogenation before entering the vortex-tube reactor. This is checked in the colder fraction in the core and terminated by quenching at the ports 27, while the hot fraction is heated to establish equilibrium conditions which favor the formation of acetylene. As a specific example, when the gas entering the vortex-tube reactor is at a temperature of 1000° C., the temperature of the colder gas fraction may be at 700 to 850° C., while the hot fraction is heated to assume a temperature above 1000° C., e.g., 1050° to 1250° C. It should be noted that the temperature assumed by the hot fraction is considerably below that which would occur if the reaction were not endothermic.

*Example I*

Ethane is heated in a fired tubular heater to a temperautre of 900° C. to produce a gas stream having a pressure of two atmospheres abs., thereby effecting dehydrogenation and a small amount of cracking to methane. The stream contains approximately, on a mol basis, 9% ethane, 45% ethylene, and 45% hydrogen as the principal constituents. It is charged to a vortex-tube reactor as shown, having an initial diameter of 0.390 in., and a cylindrical section of the latter diameter 3.02 in. in length. The gas enters the swirl chamber 21 at sonic velocity of about 2750 ft. per sec., the inlet passages 22 having an aggregate area 0.063 sq. in. 30% of the gas is water-quenched to below 500° C. and discharged at the hot end and contains, as its main constituents 2.2% ethane, 17.8% ethylene, 16.7% acetylene, 11.1% methane, and 52.2% hydrogen.

Figure 5:
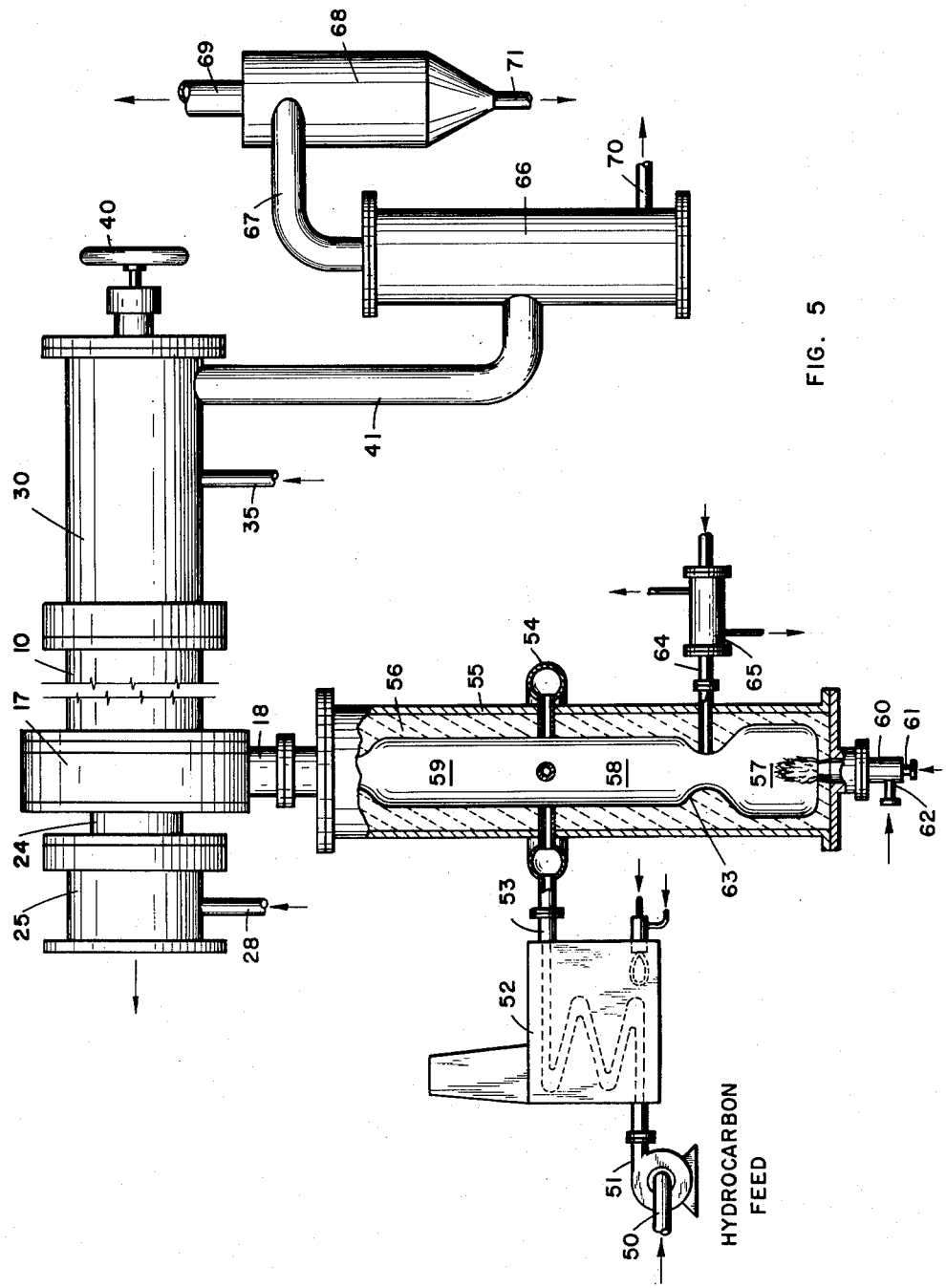
FIGURE 5 is a diagrammatic view of apparatus for carrying out a modification in the process.

FIGURE 5 shows the use of the vortex-tube reactor in a process wherein flame gases, cooled by a temperature-stabilizing substance, are used to effect at least part of the heating of the reactant hydrocarbons. The vortex-tube reactor, including the parts 10, 17, 18, 24, 25, 28, 30, 35, 40 and 41, is as was previously described, save that the inlet pipe 18 and housing 17 are advantageously lined with heat-resistant refractory material to withstand the higher temperatures encountered. The hydrocarbon feed stream, supplied by a pipe 50, is brought to the desired pressure by the feed pump or compresor 51 and is optionally preheated to 500° to 900° C. in a tubular heater 52 and passed through a transfer pipe 53 and header 54 into a reaction chamber. The latter includes a metallic shell 55 containing refractory lining 56, shaped to provide a combustion zone 57, a vaporizing zone 58 and a reaction zone 59, the last discharging directly into the inlet pipe 18. The combustion zone is fitted with a burner 60 to which a hydrogen-containing fuel, such as hydrogen or methane is admitted at 61 and oxygen or air is admitted at 62. It is partly isolated from the vaporizing zone by a throat 63 to which a non-gaseous temperature-stabilizing substance is admitted via a pipe 64, preferably in the liquid state and preheated in a heater 65. This substance vaporizes in the hot combustion gases within the vaporizing zone, cooling the said gases from their initial temperature of 2100°–2800° C. and storing energy as latent heat of vaporization. The mixture of cooled flame gases and vaporized substance, at a temperature below that at which significant oxygen dissociation products occur, e.g., below 1700° C., such as 1500° C., heats the hydrocarbon gas admitted from the header 54 and dehydrogenation occurs within the reaction zone 59. Due to the endoenthalpic nature of the reaction the temperature falls as the mixture ascends through the reaction zone, causing condensation of at least some of the temperature-stabilizing substance, which thereby gives up its latent heat.

The partially reacted mixture enters the vortex-tube reactor 10 at a temperature between about 800° and 1200° C. and a part of the gas is further heated in the hot end of the tube to produce acetylene as was described above.

The quenched effluent streams may be treated in any suitable manner to recover the temperature-stabilizing substance and quench liquid. For example, the gas from the pipe 41 may be passed through a knock-down vessel 66, wherein most of the non-gaseous constituents are separated by gravity, and thence via a pipe 67 to a cyclone 68 from which the gas is discharged at 69. Non-gaseous constituents are discharged at 70 and 71 and may be treated together to permit the temperature-stabilizing substance to be re-used. The gas discharged from the section 25 may be similarly treated.

It may be noted that the quench liquid may be water, a hydrocarbon, or be the same as the temperature-stabilizing substance admitted at 64. The last of these is desirable because it simplifies recovery of the temperature-stabilizing substance, particularly when it is water-soluble, and is particularly suitable when low-melting substances, lithium iodide, boron oxide, cadmium fluoride, gallium and lead are used.

*Example II*

Hot flame gases at a pressure of two atmospheres, abs., from an oxyhydrogen flame, at an initial temperature of 2740° C., are cooled to 1700° C. by injecting liquid lithium iodide at a temperature of 1025° C. and vaporizing the salt. Ethane, at the same pressure, is preheated to 750° C. and mixed with the flame product-salt vapor mixture to produce a partially dehydrogenated stream having a temperature of 1025° C. and containing finely dispersed, condensed lithium iodide. Only negligible quantities of oxygenated dissociation products are introduced because of the reduced flame-gas temperature and because only a small amount of the flame gases are required to produce a partially dehydrogenated stream of 1025° C. The stream is charged into the vortex-tube reactor described in the previous example, operated at an absolute pressure of of 18 lbs. per sq. inch from which 50% of the stream is discharged at the hot end, enriched in acetylene, having attained a peak temperature of about 1150° C. (the exact temperature is difficult to measure). Liquid lithium iodide at 450° C. is used as quench liquid. The compositions of the streams are given as mol percent: (dry LI-free basis)

|  | Partially dehydrogenated feed to vortex-tube | Hot-gas fraction from vortex tube |
| --- | --- | --- |
| Carbon monoxide | 2.7 | 2.3 |
| Ethane | 4.6 | 2.0 |
| Ethylene | 22.5 | 7.0 |
| Acetylene | 11.5 | 23.3 |
| Hydrogen | 46.8 | 54.5 |
| Methane | 11.9 | 10.9 |

I claim as my invention:

1. A process for the pyrolysis of hydrocarbon reactants to produce unsaturated hydrocarbons having a higher carbon-to-hydrogen ratio which comprises: preheating hydrocarbon reactants and producing a gaseous stream thereof; admitting said stream at a temperature of at least 700° C. with vortical motion into a confined, elongated vortex zone to form a gas-vortex and therein transferring heat by the heat-separation effect from the part of said admitted gas at the vortex core to the part of said admitted gas at the vortex periphery, thereby heating the latter gas to pyrolysis temperature and dehydrogenating said hydrocarbon reactants said preheating and heating in the vortex zone being effected essentially in the absence of oxygen and oxygenated dissociation products; and continuously discharging gas including dehydrogenation reaction products from said vortex zone.

2. Process according to claim 1 wherein said gaseous stream is essentially free from oxygen-containing compounds while within said vortex zone.

3. Process according to claim 2 wherein said hydrocarbon reactants are preheated by indirect heat exchange.

4. Process for the pyrolysis of hydrocarbon reactants to produce unsaturated hydrocarbons having a higher carbon-to-hydrogen ratio which comprises the steps of producing a stream of hot flame gases by burning a hydrogen-containing fuel with oxygen, said gases having a temperature above 2100° C., cooling said flame gases to below 1700° C. by injecting thereinto a temperature-stabilizing substance in the non-gaseous state and vaporizing said substance in said gases, the said substance having a vaporizing temperature between 1000° and 1700° C. at the partial pressure thereof in said flame gas; admixing said hydrocarbon reactants with the resulting mixture of hot flame gases and vapors of the said substance to preheat the reactants and produce a gaseous stream; admitting said gaseous stream at a temperature of at least 700° C. with vortical motion into a confined, elongated vortex zone to form a gas-vortex and therein transferring heat by the heat-separation effect from the part of the admitted gas at the vortex core to the part of said admitted gas at the vortex periphery, thereby heating the latter gas to pyrolysis temperature and dehydrogenating said hydrocarbon reactants essentially in the absence of oxygen and oxygenated dissociation products; and continuously discharging gas including dehydrogenation products from said vortex zone.

5. Process according to claim 4 wherein said temperature-stabilizing substance is liquefied and preheated to a temperature above 700° C. prior to injection.

6. Process according to claim 4 wherein said temperature-vaporizing substance has a vaporizing temperature above the temperature to which said gas at the periphery of the gas-vortex is heated by the heat-separation effect.

7. Process according to claim 4 wherein said hydrocarbon reactants are preheated, prior to admixture with said hot flame gases, by indirect heat exchange to a temperature above 600° C.

8. Process for the pyrolysis of hydrocarbons to produce unsaturated hydrocarbons having a higher carbon-to-hydrogen ratio which comprises: preheating saturated hydrocarbons to a temperature between 800 and 1200° C. and thereby effecting partial dehydrogenation thereof to produce a gaseous stream containing olefins; admitting said gaseous stream as the only admitted material at a temperature above 800° C. tangentially into a confined, elongated vortex zone to form a gas-vortex and therein transferring heat by the heat-separation effect from the part of said admitted gas at the vortex core to the part of said admitted gas at the vortex periphery, thereby heating the latter gas to a temperature above 1050° C. which is at least 80° C. warmer than the inlet temperature of said gaseous stream and effecting further dehydrogenation in said latter part and forming acetylene therein, said preheating and heating in the vortex zone being effected essentially in the absence of oxygen and oxygenated dissociation products; and continuously discharging gas from the vortex and quenching at least the gas containing said acetylene to a temperature at which dehydrogenation substantially ceases.

9. Process for the production of acetylene from saturated hydrocarbons which comprises preheating said saturated hydrocarbons by indirect heat exchange and producing a gaseous stream thereof having a temperature above 800° C. essentially in the absence of oxygen and oxygen-containing compounds, thereby effecting partial dehydrogenation of said saturated hydrocarbons to produce a first reaction product containing mainly olefins; admitting said stream, including said first reaction products, as the only admitted material at a temperature between 800° and 1200° C., tangentially into an elongated, confined vortex zone to form a gas-vortex therein and transferring heat by the heat-separation effect from the part of the gas at the vortex core to the part of the gas at the vortex periphery and thereby heating the latter part to a temperature at least 80° C. higher than that of the admitted stream and effecting further dehydrogenation to produce a reaction product containing a higher concentration of acetylene than said first reaction product; discharging the latter part of the gas from the vortex zone at a point remote from the point of admission; quenching the said discharged part to a temperature at which said pyrolysis substantially ceases; and continuously discharging gas from the core part of the vortex at a point near the said point of admission.

10. A vortex-tube reactor comprising an elongated tube having an interior surface of revolution formed by refractory material; means for preheating a reactant and producing a heated reactant stream in the gaseous state having a temperature of at least 700° C.; means for admitting said heated reactant with a vortical motion to an inlet section of said tube; quenching means for admitting a quench fluid to a part of said tube removed from said inlet section; and separate outlets for discharging, respectively, gas from the central axis of said tube near said inlet section and heated gas which flows past the said quenching means.

11. In combination with the reactor as defined in claim 10, additional quenching means for admitting a quench fluid to the gas discharged from the central axis of said tube.

12. Apparatus according to claim 10 wherein said preheating means consists of a tubular heater for preheating said reactants without dilution.

13. A vortex-tube reactor comprising an elongated tube having an interior surface of revolution formed by refractory material; inlet means including an outer, refractory-lined feed chamber, an inner swirl chamber in free communication with said tube, and inlet port means for feeding reactant gas from said feed chamber tangentially into said swirl chamber to form a gas-vortex; a wall adjoining the side of the swirl chamber opposite to said tube, said wall having therein a central orifice for discharging gas from the core of said vortex; a hot-gas outlet for discharging reacted gas from the periphery of said gas-vortex; and quenching means for injecting a quench fluid into the latter gas at a point remote from the swirl chamber.

14. A vortex-tube reactor comprising an elongated tube having an interior surface of revolution formed by refractory material; preheating means comprising a burner and combustion chamber to produce hot flame gas, a vaporizing chamber connected to receive said flame gas and having means for injecting a non-gaseous temperature-stabilizing substance for vaporization in said flame gas for lowering the temperature thereof, and a mixing chamber downstream from said vaporizing zone having means for admixing reactants to the mixture of flame gases and vaporized temperature-stabilizing substance; inlet means for admitting the hot mixture from said mixing chamber with vortical motion to an inlet section of said tube; quenching means for admitting a quench fluid to a part of said tube removed from said inlet section; and separate outlets for discharging, respectively, gas from the central axis of said tube near said inlet section and heated gas which flows past said quenching means.

References Cited in the file of this patent

UNITED STATES PATENTS

| | | |
|---|---|---|
| 2,396,697 | Gorin | Mar. 19, 1946 |
| 2,750,420 | Hepp | June 12, 1956 |
| 2,750,434 | Krejci | June 12, 1956 |
| 2,758,914 | King | Aug. 14, 1956 |
| 2,823,243 | Robinson | Feb. 11, 1958 |
| 2,893,215 | Hendal | July 7, 1959 |
| 2,912,475 | Krause et al. | Nov. 10, 1959 |
| 3,005,857 | Steinhofer et al. | Oct. 24, 1961 |
| 3,010,795 | Friauf et al. | Nov. 28, 1961 |

OTHER REFERENCES

Vickers: "Nature," vol. 180, No. 4597, 1957, pages 1271–2.